United States Patent [19]

Beier et al.

[11] Patent Number: 4,558,574
[45] Date of Patent: Dec. 17, 1985

[54] WOOL WASHING AND RECOVERY OF WOOL WAX AND WATER THEREFROM

[75] Inventors: Oskar H. G. Beier; Joseph B. J. Kerf, both of Natal, South Africa; Sven G. Ekegren, Uttran, Sweden

[73] Assignees: O.T.H. Beier & Company (Proprietary) Limited; Alfa-Laval Separation AB

[21] Appl. No.: 514,797

[22] Filed: Jul. 19, 1983

[30] Foreign Application Priority Data

Jul. 21, 1982 [ZA] South Africa .................. 82/5207

[51] Int. Cl.⁴ .................................... D01C 3/00
[52] U.S. Cl. ............................. 68/18 R; 8/139
[58] Field of Search ............... 68/1, 18 D, 18 R; 8/138, 139, 139.1, 141; 260/412.5, 412.8

[56] References Cited

U.S. PATENT DOCUMENTS

| | | | |
|---|---|---|---|
| 1,920,469 | 8/1933 | Jones | 8/139 X |
| 2,183,142 | 12/1939 | Mackenzie | 8/139 |
| 2,762,681 | 9/1956 | Crowley | 8/139 |
| 2,897,043 | 7/1959 | Fong | 8/139 |
| 3,600,124 | 8/1971 | Couche et al. | 8/139 X |
| 3,619,116 | 11/1971 | Saville | 8/139 X |
| 3,871,820 | 3/1975 | Stewart et al. | 68/18 D X |
| 4,059,516 | 11/1977 | Heisey | 8/139 X |
| 4,349,347 | 9/1982 | Masri et al. | 68/18 D X |

Primary Examiner—Philip R. Coe
Attorney, Agent, or Firm—Lowe, King, Price & Becker

[57] ABSTRACT

The invention concerns a wool washing arrangement whereby the washings are divided into a wool-wax containing line and two sludge-containing lines of which the first sludge containing line contains wax-bearing sludge and the second contains wax-free sludge, the first sludge is treated for separation of the wax and the sludge and the second for separation of the sludge, the supernatant liquor from the latter being mixed with at least a portion of a flow containing a high concentration of soluble salts.

2 Claims, 1 Drawing Figure

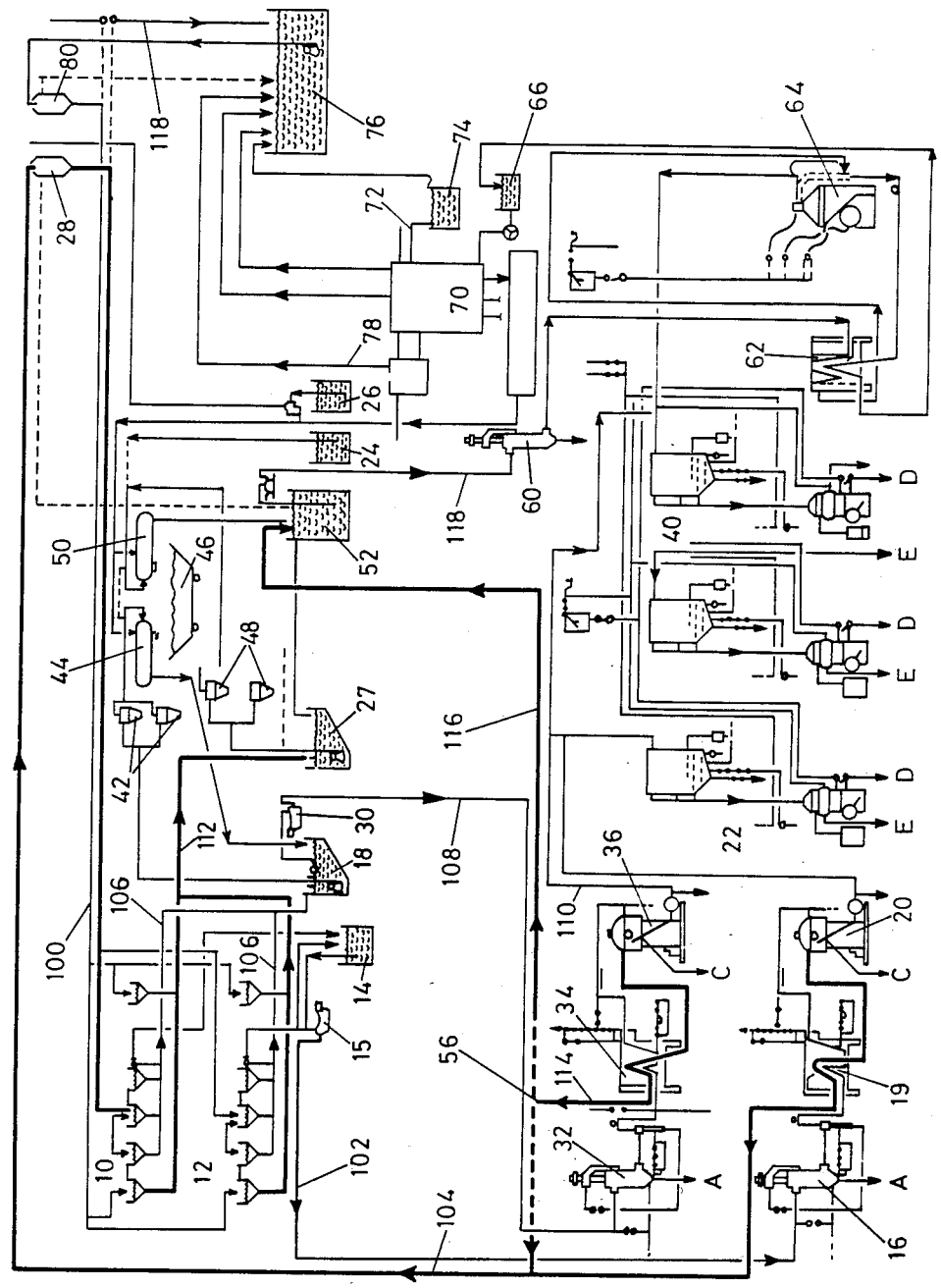

WOOL WASHING AND RECOVERY OF WOOL WAX AND WATER THEREFROM

FIELD OF THE INVENTION

This invention relates to the washing of wool and the subsequent recovery of wool wax in substantially pure form and water.

BACKGROUND OF THE INVENTION

Conventional plants for wool washing have generally a series of bowls in which raw wool is washed countercurrently with water to remove the wool wax and the sludges. These bowls are often preceded by a cold water wash in which the soluble matter is first removed (the suint salts) and are often followed by a rinse, also with cold water. The sludge-containing water and the wax-containing water are separated and treated separately by means of decanters centrifuges and sedimentation apparatus and the remaining water is evaporated to be returned to the wool washing zone.

One of the problems which has faced the industry has been the difficulty experienced in the evaporation step due to the presence of waxes and it is one of the objects of the present invention to reduce this difficulty.

A further object of the invention is to reduce the water necessary to be evaporated than was the case in prior art arrangements known to the applicants.

THE INVENTION

According to the invention, in a wool washing arrangement, the resulting washings are divided into a wool-wax containing line and two sludge-containing lines, the first of these comprising wax-bearing sludge and the second comprising wax-free sludge, the wax-containing sludge being treated for separation of the wax and sludge, the non-wax-containing sludge being treated for separation of the sludge, and its supernatant liquor being mixed with at least a portion of a flow containing a high concentration of soluble salts.

In a preferred form of the invention, the soluble salt-containing flow is derived from or includes the supernatant liquor resulting from the removal of the wax and sludge from the wax-containing sludge line.

The wool-wax containing line may be derived by decantation from the washing bowls and may be processed directly to an A grade wax. The wax from the wax-containing sludge line may be separately processed to give a B grade wax and the supernatant liquor from this separation, or a fraction thereof, may be used as the soluble salt-containing flow. Obviously, the exact fraction of this supernatant liquor will depend largely on the type of wool being scoured, but it has been found that about one-third is a suitable fraction.

The amount of soluble salts in the supernatant liquor really determines the fraction to be added because it is these salts which cause destabilisation of the wax-in-water emulsion of the effluent required to be evaporated.

Thus, it will be seen that the essence of the invention is the separation of the sludge streams which (a) reduces greatly the amount of effluent needed to be evaporated and (b) enables the build up of a high suint salt containing stream which is used for the destabilisation of the emulsion in the effluent required to be evaporated.

In a preferred form of the invention the thus treated effluent is further treated for separation of wax which has been freed from its emulsion form.

This results in (a) a further recovery of wool-wax (b) the elimination of virtually all the wool-wax prior to the entry into the evaporator which enables the cleaning intervals of the evaporator to be greatly increased.

EMBODIMENT OF THE INVENTION

An embodiment of the invention is described below with reference to the accompanying FIGURE which shows a flowsheet of the system.

In the flowsheet, a series of wash bowls 10 and 12 is provided. The first bowl of each series is a cold water steep bowl and the clean water line 100 enters the arrangement at these points. The next three bowls (2 through 4) are hot water washes in countercurrent arrangement and the last bowl (5) is a rinsing step.

The wool wax is continuously withdrawn from the surface of the side tank of the second bowl (2) and led to a wool-wax collecting tank 14, from which by means of pump 15 is led along line 102 to a brush strainer/cyclone 16 from which the sludge A is transferred to a tank 18 which will be described further below. A heat exchanger 19 is provided and the wax is finally separated in concentrated form in a centifuge 20 whence it proceeds to a purifying apparatus generally designated as 22, to give an A grade wool wax. The sludge D and supernatant liquor from this purifier are led to tanks 24,26 which will also be further described below. Sludge C from the centrifuge 20 is led to a tank 27 which will also be described fully below.

The heated supernate from this separation zone is led along line 104 to a holding tank 28.

The sludge line 106 from the three hot water washing bowls leads to the tank 18 which constitutes the tank for the wax-containing sludge line. Wool-wax emulsion is drawn from the top of this tank by pump 30 along line 108 to a separation zone similar to that for the A grade wax. This second separating zone comprises a strainer/cyclone 32, heat exchanger 34 and centrifuge 36. Again, the sludge A from the strainer/cyclone 32 is led to tank 18 and from centrifuge 36 to tank 27. The wax fraction from centrifuge 36 follows line 110 to a concentration/purifier apparatus generally designated by reference 40, and a B grade wax is obtained. Sludges D and E are led to tanks 24,26.

The sludge from tank 18 is drawn by means of a pump at a low level through cyclones 42 to decanter 44, from which sludge drips into truck 46. The supernatant liquor resulting is returned to tank 18.

The sludge line 112 from the first and fifth bowls is led to tank 27. This is the non-wax-containing sludge referred to above.

The sludge is drawn by means of a pump through cyclones 48 and decanter 50 from which the sludge drips into truck 46 and the supernatant liquor which contains soluble salts and a little wax flows to tank 52 which represents the evaporator hold tank. The overflow from this leads back to the tank 27.

Referring back to the second separating zone comprising cyclone 32, heat exchanger 34 and centrifuge 36, it will be seen that the supernatant liquor which contains further amounts of soluble salts (line 114) is divided at point 56. At this point about two thirds is led to join line 104, while the one third is led directly to tank 52 along line 116 in order to increase the concentration of soluble salts in tank 52 to cause destabilization of the wax-water emulsion; the wax following line 118 then being centrifugally removed in centrifuge 64 and thereafter introduced into the B grade wax purification stream via line 65 through concentrator 67 to purifier 40. This represents that fraction required in the plant operated by the applicants that causes satisfactory destabilisation of the emulsions which may or are still present in the effluent tank 27.

Referring now to tanks 24 and 26 it will be seen that tank 24 leads to the decanter 44 and thus joins the effluent emanating from tank 18. The effluent from tank 26 is passed to holding tank 28.

The destabilised effluent from tank 52 now follows line 118 through strainer 60 and then to heat echanger 62 and then to clarifier 64, back through the heat exchanger 62 and then to a tank 66 which feeds the evaporator 70.

The wax-containing fraction from the clarifier 64 is led to the concentrator/purifier 40.

Turning now the evaporator portion of the plant, the evaporator 70 has a first condensate outlet 72 leading to a boiler hot well 74 whose overflow leads to a clean water collecting tank 76, a second condensate outlet 73 from evaporator 70 leads to tank 76. Furthermore a source of cold water generally designated by 78 and which represent cooling tower water, bleed water also leads to the tank 76. The necessary amount of fresh water make up enters the collecting tank 76 along line 118 and the clean water is held in tank 80, which acts as a buffer header tank. The concentrate is fed directly into the two decanter sludge phases.

We claim:

1. A wool washing apparatus, comprising means for establishing a plurality of washing zones, means for introducing hot water to one or more of the washing zones, means for withdrawing a first wax rich stream from said zone or zones and means for discharging a second sludge and wax stream from outlets at or adjacent a bottom of said zone or zones, there being means for introducing cold water to one or more further zones used for at least one of a pre-wash and final rinse zone or zones, the outlet of said at least one pre-wash and final rinse zone or zones forming a third low wax containing sludge stream, the apparatus further including means for removing sludge from the second stream and for recovering wax from the first and second streams, and for returning a major portion of the supernatant liquor containing soluble salts from the first and second streams to the washing zones, and for mixing with the third stream a minor portion of said liquor containing sufficient soluble salts for destabilizing the third stream, separating the resulting wax from the destabilized third stream to form a wax free effluent, and leading the wax free effluent to a final treatment stage.

2. An apparatus according to claim 1 in which the final treatment stage is an evaporation stage, the condensate being returned to the washing stage.

* * * * *